United States Patent [19]

Schulze

[11] 4,377,954
[45] Mar. 29, 1983

[54] JAW FOR WIRE-STRIPPING PLIERS

[75] Inventor: Rainer Schulze, Detmold, Fed. Rep. of Germany

[73] Assignee: C. A. Weidmuller GmbH & Co., Detmold, Fed. Rep. of Germany

[21] Appl. No.: 267,985

[22] Filed: May 28, 1981

[30] Foreign Application Priority Data

Jun. 7, 1980 [DE] Fed. Rep. of Germany ... 8015173[U]

[51] Int. Cl.³ .............................................. H02G 1/12
[52] U.S. Cl. ................................................... 81/9.5 A
[58] Field of Search .......................... 81/9.5 R, 9.5 A; 30/90.1

[56] References Cited

U.S. PATENT DOCUMENTS

| 2,889,728 | 6/1959 | Hindenburg | 81/9.5 A |
| 3,915,037 | 10/1975 | Wiener | 81/9.5 A |
| 4,112,791 | 9/1978 | Wiener | 81/9.5 A |
| 4,197,768 | 4/1980 | Undin | 81/9.5 A |
| 4,215,598 | 8/1980 | Wells | 81/9.5 A |

*Primary Examiner*—James G. Smith
*Attorney, Agent, or Firm*—Pollock, Vande Sande & Priddy

[57] ABSTRACT

Wire-stripping pliers include stripping jaws which close with and then move longitudinally relative to clamping jaws for stripping the insulation. A conductor end stop is mounted on a stripping jaw to define the stripped length and consists of an H-section member of which the web forms the stop abutment and the side limbs can flex in response to pressure on their upper ends for engaging and disengaging teeth on their lower ends from corresponding teeth on the sides of the stripping jaw.

6 Claims, 4 Drawing Figures

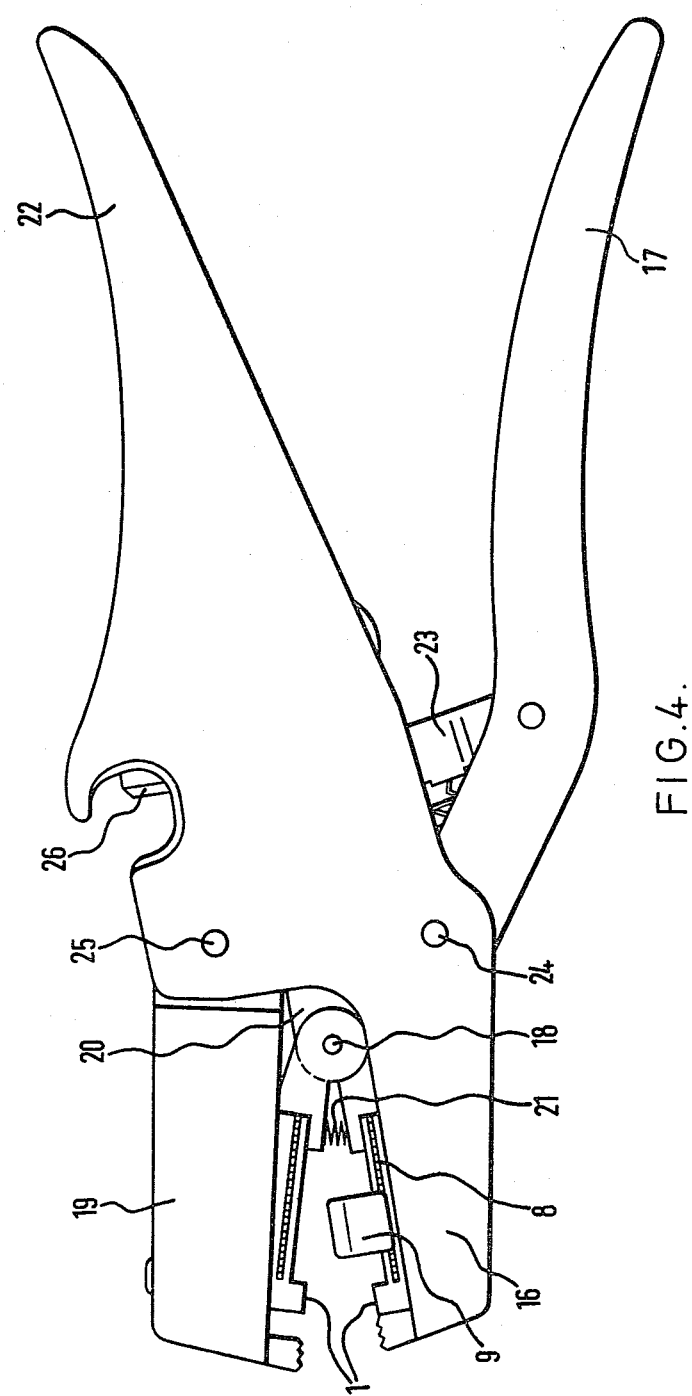

JAW FOR WIRE-STRIPPING PLIERS

This invention relates to wire-stripping pliers, and in particular to the stripping jaws provided on these.

The invention is concerned with wire-stripping tools of the kind incorporating two pairs of jaws, namely a pair of clamping jaws for holding the insulated part of a conductor, and a longitudinally movable pair of stripping jaws for cutting and stripping off the insulation of a conductor. Wire-stripping pliers of this general kind are known for example from British Pat. Nos. 1,488,808 and 1,564,199, and U.S. Pat. Nos. 3,422,708, 3,915,037 and 4,112,791.

In such pliers, closure of the handles of the pliers initially closes pairs of jaws, so that an insulated conductor is gripped between the clamping jaws and its insulation is cut by the stripping jaws. Continued closing movement of handles causes the cutting jaws to move longitudinally, so as to strip the severed insulation from the end of the conductor held between the clamping jaws.

To facilitate the stripping of a predetermined length of insulation, a conductor end stop may be provided on one of the stripping jaws. In one known construction, the stripping jaws has a body with opposite side faces in which are longitudinal grooves with serrated bottoms, and the end stop is a channel-section plastics member which grips the body by means of teeth on the free ends of its side limbs. This form of end stop has proved to be extremely inconvenient in use because it is almost impossible to adjust its position on the stripping jaw without the use of a tool, as the design of the end stop does not provide easy release of the serrations on the end stop from those on the stripping jaw.

The object of the present invention is to provide a conductor end stop for wire stripping pliers, which can be moved easily, without the use of a tool or great effort, while ensuring reliable fixing of the stop in the desired position.

According to one aspect of the present invention there is provided a wire-stripping tool: comprising a pair of relatively pivotable operating members, a pair of relatively pivotable clamping jaws arranged to move towards one another in response to movement of the said members towards one another for gripping an insulated conductor inserted between the clamping jaws, a pair of stripping jaws disposed between the clamping jaws for closure therewith and provided with insulation-cutting means, a mechanical linkage operable by movement of the operating members towards one another and connected to the cutting jaws for longitudinally retracting these after closure thereof, and an end stop mounted on a said cutting jaw for limiting the depth of insertion of a conductor, and in which the said cutting jaw comprises a body with opposed side faces each provided with a longitudinal row of teeth, and the end stop is a member of substantially H-section with a central transverse web forming an end stop abutment and with side limbs each having at one end an in-turned hook portion toothed to grip said teeth of the cutting jaw when the end stop is mounted on said cutting jaw with its web between the two cutting jaws, each side limb having an opposite end forming an actuating lever, and each side limb being resiliently flexible about the web whereby on movement of said opposite ends towards each other the said no ends will be moved apart to release the teeth thereon from the said teeth provided on the cutting jaw.

According to another aspect of the invention, there is provided a stripping jaw for a wire-stripping tool, comprising a jaw body having side walls and having disposed therein a cutting device for severing the insulating sheath of a conductor and with a conductor stop which is disposed on the stripping jaw so as to be adjustable along the axis thereof relative to the cutting device, and wherein the stop has a middle web extending over the jaw body, gripping lugs which are mounted on both sides of said web and on the underside of which are provided with a hook-like, inwardly projecting ledge which is serrated at the free edge, the body side walls have longitudinal grooves with serrated bases, in which the serrated ledges engage, and the lugs are double-armed actuating levers each secured in its middle zone on the middle web by means of a hinge in the form of a zone of material of reduced thickness with the hinge axis parallel with the serrated ledge.

An end stop in accordance with the invention can be released from the stripping jaw simply by gripping the free ends of the actuating levers between a finger and thumb so as to flex the levers about the central web, thereby moving the toothed or serrated portions of the end stop apart. The end stop can then be moved along the jaw to a desired position, and when it is released it will again grip the teeth provided on the stripping jaw to fix the end stop in position on the jaw.

Preferably, the end stop is made of a resilient plastics material.

The invention will be further described, by way of example, with reference to the accompanying drawings, in which:

FIG. 4 shows wire-stripping pliers incorporating stripping jaws and a conductor stop as shown in FIGS. 1 to 3.

Figure 1:
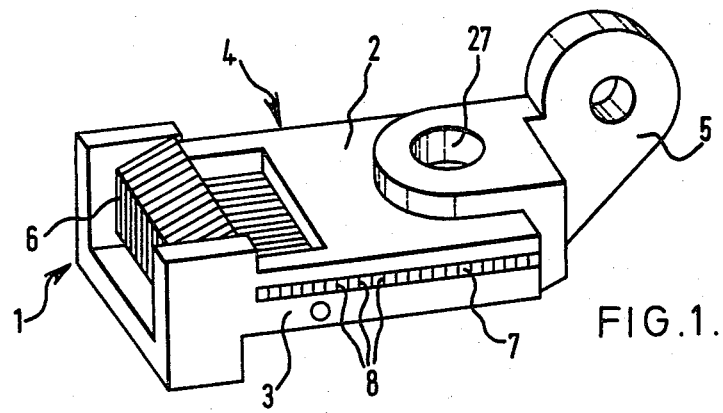
FIG. 1 is a perspective view of a stripping jaw.

The illustrated wire-stripping pliers are constructed generally as described in the above mentioned British Pat. Nos. 1,488,808 and 1,564,199, and U.S. Pat. Nos. 3,915,037 and 4,112,791. They comprise a pair of handles 17, 22 pivoted on one another at a pivot 24, and a pair of relatively pivotable clamping jaws 16, 19. The clamping jaw 16 is integral with the handle 22. The clamping jaw 19 is pivoted at 25 relative to the jaw 16 and handle 22. A driving arm 23 mounted pivotably on the handle 17 acts on an extension of the clamping jaw 19 so that, when the handles 17, 22 are closed together, the clamping jaws 16, 19 are also closed together. The tips of the clamping jaws have serrations for gripping the insulation of an insulated electrical conductor inserted between the jaws.

Mounted within and between the clamping jaws is a pair of stripping jaws 1 hinged together at 18 and normally urged apart by a spring 21. The hinge 18 is connected to a mechanical linkage 20 operated by the arm 23. The stripping jaws can slide longitudinally in the clamping jaws, and the actuating mechanism is so arranged that when the handles of the pliers are closed, initially the stripping jaws 1 close together with the clamping jaws, so that cutters in the stripping jaws cut the insulation of the inserted conductor; thereafter, further closing movement of the handles operates the mechanical linkage 20 so that the closed stripping jaws are retracted within the clamping jaws, thereby stripping off the severed insulation. Means may be provided for adjusting the depth of cutting of the stripping jaws to allow for conductors of different sizes. The pliers may also incorporate a wire cutter consisting of a fixed blade 26 and a movable blade operated by the mechanical linkage 20.

Each stripping jaw comprises an elongate plastics body 2 with a hinge eye 5 at its rear end and a seat 27 for the spring 21. At the forward end of the body are the insulation-cutting means 6, consisting of a stack of steel sheet laminations seated in the body between the opposite side walls 3, 4 of the body.

In each side wall of the body is a longitudinal groove 7 with a serrated base forming a longitudinal row of teeth 8.

The conductor end stop 9 is a H-section member of resilient plastics material with a central web 10 and integral side limbs 11. The side limbs are connected to the web by way of web end regions of reduced thickness which form hinges 12 extending in the longitudinal direction of the stop and of the jaw to which it is fitted. As seen in plan, the limbs 11 and the hinge regions 12 extend over the entire longitudinal extent of the end stop, but the central part of the web 10 is of reduced longitudinal extent but of increased thickness and forms a stop abutment with an abutment surface 28 flush with one end of the conductor stop.

Figure 2:
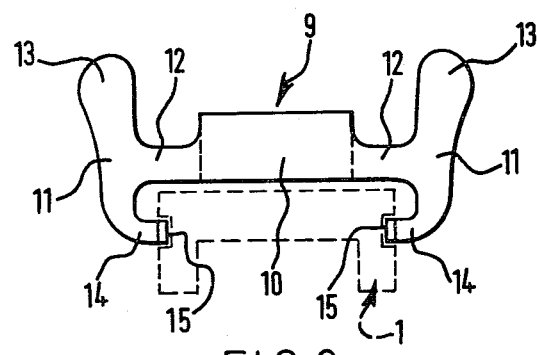
FIG. 2 is an end view of a conductor end stop which can mounted on the stripping jaw shown in FIG. 1.
Figure 3:
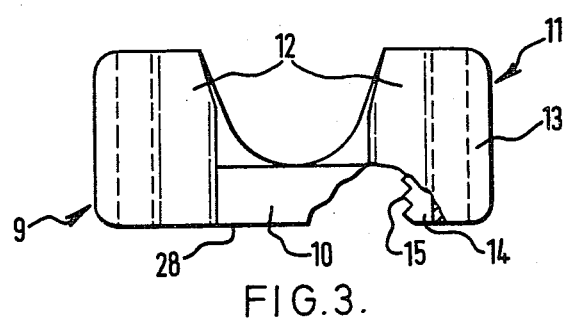
FIG. 3 is a plan view, partly cut away, of the conductor stop shown in FIG. 2.

Each limb 11 has at its lower end an in-turned hook-like portion 14 on the free end of which are serrations 15 forming a toothed rack with teeth corresponding to those on the sides of the stripping jaw. The end stop is fitted to the stripping jaw as shown in FIG. 2 so that its serrations grip those of the stripping jaw by virtue of the resilience of the material of the end stop, with the stop abutment portion overlying the stripping jaw (it is to be understood that words implying a particular orientation are used only with reference to the components in the positions illustrated in the drawings).

The side limbs are in the form of double-armed actuating levers, with their upper ends shaped to form rounded grip elements 13. Each limb is resiliently flexible by virtue of the associated hinge 12. Consequently, if the grip elements 13 are pressed towards one another for example by the thumb and a finger of the user, the limbs will pivot relative to the web by resilient flexing of the hinges, and the serrations 15 will be moved apart and thereby released from the serrations of the stripping jaw. When the grip elements 13 are released, the resilience of the material of the end stop will cause the serrations 15 to grip the serrations of the stripping jaw. The conductor end stop is therefore normally held firmly in the desired position on the stripping jaw, but can easily be released by the user and moved to a different position on the stripping jaw, to define any desired length of insulation for stripping from a conductor according to the distance between the stop abutment surface and the cutting means 6.

It will be understood that the conductor end stop can be fitted to either jaw of the pliers.

I claim:

1. A wire-stripping tool comprising a pair of relatively pivotable operating members, a pair of relatively pivotable clamping jaws arranged to move towards one another in response to movement of the said members towards one another for gripping an insulated conductor inserted between the clamping jaws, a pair of stripping jaws disposed between the clamping jaws for closure therewith and provided with insulation-cutting means, a mechanical linkage operable by movement of the operating members towards one another and connected to the cutting jaws for longitudinally retracting these after closure thereof, and an end stop mounted on a said cutting jaw for limiting the depth of insertion of a conductor, and in which the said cutting jaw comprises a body with opposed side faces each provided with a longitudinal row of teeth, and the end stop is a member of substantially H-section with a central transverse web forming an end stop abutment and with side limbs each having at one end an in-turned hook portion toothed to grip said teeth of the cutting jaw when the end stop is mounted on said cutting jaw with its web between the two cutting jaws, each side limb having an opposite end forming an actuating lever, and each side limb being resiliently flexible about the web whereby on movement of said opposite ends towards each other the said one ends will be moved apart to release the teeth thereon from the said teeth provided on the cutting jaw.

2. A wire-stripping tool as claimed in claim 1 in which the said web has regions of reduced thickness adjacent to the side limbs of the end stop which regions constitute hinges for flexing of the limbs.

3. A wire-stripping tool as claimed in claim 2 in which the hinge regions of the web and the side limbs extend over the whole longitudinal extent of the end stop, and the web has a central region extending over only a part of the said longitudinal extent which central region has an end stop abutment surface disposed at one end of the end stop.

4. A stripping jaw for a wire-stripping tool, comprising a jaw body having side walls and having disposed therein a cutting device for severing the the insulating sheath of a conductor and with a conductor stop which is disposed on the stripping jaw so as to be adjustable along the axis thereof relative to the cutting device, and wherein the stop has a middle web extending over the jaw body, gripping lugs which are mounted on both sides of said web and on the underside of which are provided with a hook-like, inwardly projecting ledge which is serrated at the free edge, the body side walls having longitudinal grooves with serrated bases, in which the serrated edges engage, and the lugs are double-armed actuating levers, each secured in its middle zone on the middle web by means of a hinge in the form of a zone of material of reduced thickness with the hinge axis parallel with the serrated ledge.

5. A stripping jaw according to claim 4 in which the top edges of the actuating levers are formed as rounded grip elements.

6. A stripping jaw according to claim 4 or 5 in which, proceeding from one conductor stop end, the middle web extends over only part of the conductor stop length and the hinges are integrally formed on the middle web, proceeding from the ends of the actuating levers which extend over the entire length of the conductor stop.

* * * * *